United States Patent [19]

Vicard et al.

[11] Patent Number: 5,990,374
[45] Date of Patent: *Nov. 23, 1999

[54] METHODS FOR THE HEAT TREATMENT OF RESIDUES OF THE CLEANING OF FUMES AND RESIDUES OF THE INDUSTRIAL PROCESS EMITTING THESE FUMES

[75] Inventors: Jean-François Vicard; Fabrice Gourmelon, both of Lyons, France

[73] Assignee: Lab Group, Lab S.A., Lyons, Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/727,665
[22] PCT Filed: Apr. 28, 1995
[86] PCT No.: PCT/FR95/00555
  § 371 Date: Oct. 17, 1996
  § 102(e) Date: Oct. 17, 1996
[87] PCT Pub. No.: WO95/30112
  PCT Pub. Date: Nov. 9, 1995

[30] Foreign Application Priority Data

Apr. 28, 1994 [FR] France .................................. 94 05418

[51] Int. Cl.$^6$ ...................................................... A62D 3/00
[52] U.S. Cl. .......................... 588/228; 588/209; 588/213; 588/216; 588/224; 588/234; 588/240; 588/252
[58] Field of Search ............................... 423/1, 107, 155, 423/659; 588/209, 252, 228, 213, 216, 224, 234, 240

[56] References Cited

U.S. PATENT DOCUMENTS

| 5,434,333 | 7/1995 | Jantzen et al. | 588/252 |
| 5,550,312 | 8/1996 | Schingnitz et al. | 588/208 |
| 5,607,596 | 3/1997 | Vicard | 210/739 |

FOREIGN PATENT DOCUMENTS

| 0381601 | 8/1990 | European Pat. Off. . |
| 2547210 | 12/1984 | France . |
| 2696955 | 4/1994 | France . |
| 3827086 | 2/1990 | Germany . |
| 9011817 | 10/1990 | WIPO . |

*Primary Examiner*—Wayne Langel
*Attorney, Agent, or Firm*—Dowell & Dowell, P.C.

[57] ABSTRACT

An improvement to methods for heat treating flue gas cleaning residues (1) and residues from the industrial process generating said flue gases. For this purpose, the method comprises a physicochemical treatment step (2, 7), a heat treatment step (13) and a step involving treating gases generated by said heat treatment (19, 22, 28). These three steps are closely overlapped and combined both to minimise the volatilisation of volatile compounds during heat treatment and to remove separately the elements that cannot effectively be immobilised in the treated residue matrix during said heat treatment. The physicochemical treatment step may advantageously be combined with the wet cleaning step that may be included in the industrial process flue gas cleaning step. The method is particularly suitable for melting/vitrifying fly ash, agglomerating the finest fly ash, and destroying organic compounds such as dioxins and furans.

14 Claims, 1 Drawing Sheet

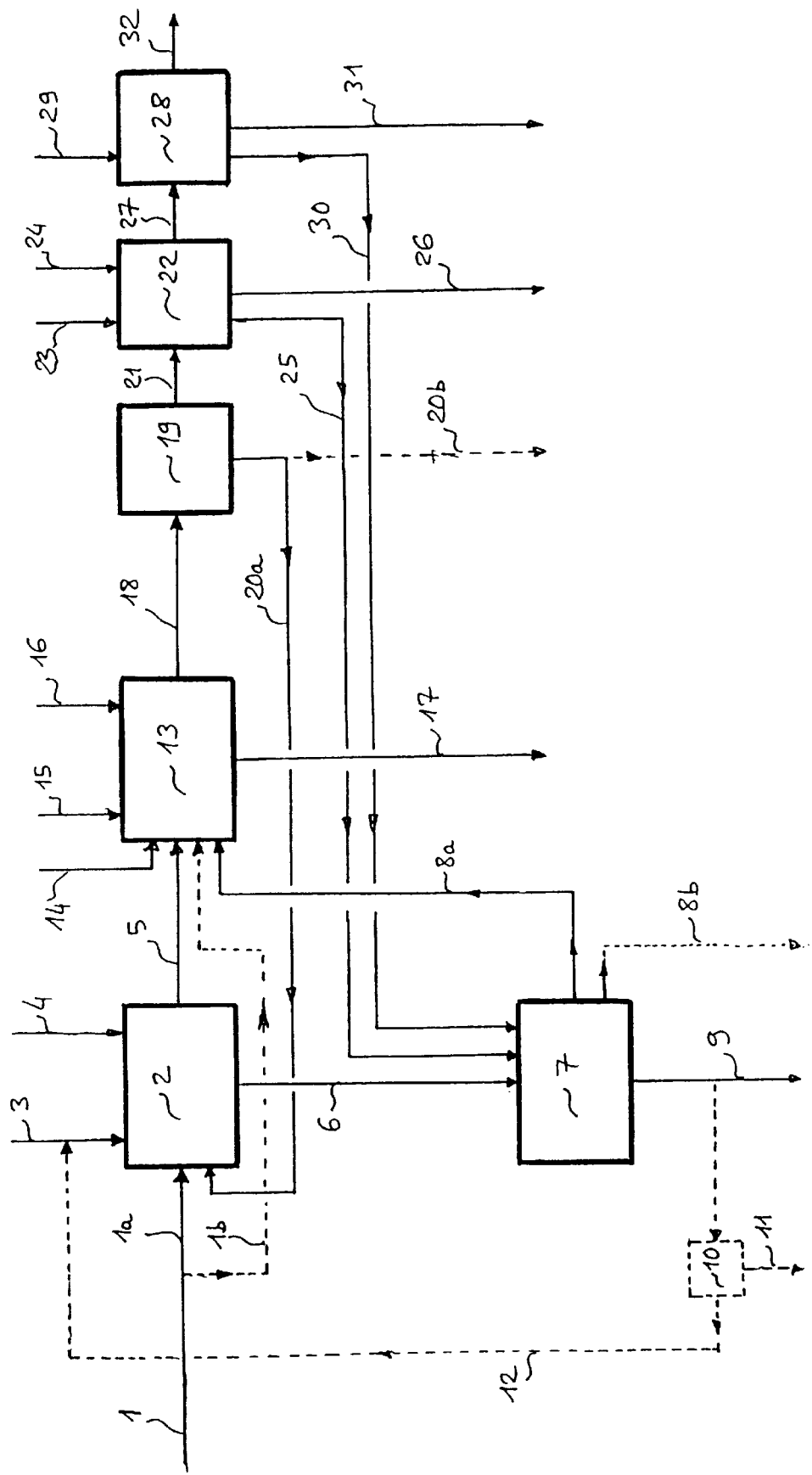

5,990,374

METHODS FOR THE HEAT TREATMENT OF RESIDUES OF THE CLEANING OF FUMES AND RESIDUES OF THE INDUSTRIAL PROCESS EMITTING THESE FUMES

BACKGROUND OF THE INVENTION

1. Field of the Invention

The present invention relates to industrial processes emitting fumes which must be cleaned before being discharged to the atmosphere and residues which must most often be treated before utilization or dumping. The present invention relates more particularly to processes employing combustion and of which the residues, including those coming from the cleaning of the combustion fumes, are treated thermically.

2. State of the Art

An industrial process employing combustion, for example combustion of solid and/or liquid fuels, generates fumes in which the impurities of the fuel are taken to high temperature. Such impurities and a part, generally small, of the combustible matter are then either volatilized and entrained with the fumes, or entrained with the fumes in the form of fine large-sized particles resulting most often from a partial fusion followed by an agglomeration and generally called slag. The volatilization of such impurities is all the greater as the temperature is higher, while the quantity of volatilized combustible matter, called unburnt residues, is all the lower as the quality of combustion is better. During cooling of the form are recombined and/or condensed either in the form of new fine particles or on the surface of the fine particles in suspension in the fumes, or, finally, in the form of deposits on the cooling surfaces of a boiler, such deposits most often being re-entrained in the form of particles in the fumes during soot-blowing. A similar phenomenon of recombination/condensation also occurs during the formation and cooling of the slags. After cooling, the fumes laden with dust and gaseous pollutants are cleaned and the resulting residues are either mixed or separated into fly ash, filter cake, etc . . . . For these residues to be of sufficient quality with a view to utilization or dumping thereof, a fuel may be used having very few impurities. However, this type of fuel is expensive and is not always available. There is an increasingly greater advantage in terms of cost in using a fuel containing impurities. And in the case of incineration of waste, there is added to the function of production/energy recovery the function of treatment of waste with a view to utilize the matter or to immobilize the pollutans such as heavy metal. This is why numerous methods are proposed for treating these residues.

For the slags, the virtual vitrification may be improved by optimizing the thermic trajectory of the slags, for example with an additional burner and slow tempering devices. However; such devices are expensive and complex, which limits use thereof. The slags are ground/screened, after removal of iron in the case of incinerating household refuse, in order to produce, on the one hand, a material utilizable as highway substructure or in building and, on the other hand, fines which must generally be treated like fly ash, as they concentrate the defects in quality of the slags, and may be of comparable granulometry. For fly ash, it has been proposed to inject it, possibly after an appropriate treatment, in the combustion process so as to melt it in the slags. This method is obviously interesting in order to reduce the unburnt residues, but it automatically leads to a considerable enrichment in elements volatilizable in the combustion process. In that case, it is necessary to maintain an outlet for fly ash, much more cancentrated in volatilizable elements and which must be treated. It has also been proposed to treat this fly ash before injection. For example in French Patent Application FR-A-2 547 210 (KERNFORSCHUNGSZENTRUM KARLSRUHE GmbH), the fly ash is leanched with the acid bleed of the wet scrubber placed immediately downstream of an electrofilter for cleaning the fumes. In Patent EP-B-0381601 (LAB S.A.) a forced leaching is effected in a device integrated in one of the hydraulic circuits of the wet scrubber ensuring collection and neutralization of the acid gases of the fumes. In both cases, the greater part of the soluble fraction may be separated and the ashes thus treated no longer cause as great a volatilization when they are injected in the process of combustion. However, the criteria of temperature and of residence time that a correct fusion of the ashes requires can often not be satisfied at the same time as the criteria required by a good combustion, as well as reasonable cost without excessive technical complexity. Moreover, the quality of the slags is limited by the necessity to volatilize little the volatilizable elements which were not eliminated during the treatment before injection, otherwise it is necessary to maintain a fly ash outlet.

It has also been proposed to effect heat treatment of the fly ash in a furnace separate from the combustion process. This method makes it possible to attain the optimal conditions for the heat treatment of the ashes without taking into account the criteria peculiar to the process of combustion. It also allows a better destruction of the residual organic compounds. And the fumes issuing from this furnace are either cleaned separately, which leads to other residues to be treated, or returned to the head of the fume cleaning of which the enrichment in volatilizable elements must be limited by a fly ash outlet.

Finally, it has been proposed to effect the heat treatment by volatilizing the heavy metals as much as possible for the residue thus treated to have a very low content of such elements. The drawback of this method is, on the one hand, of not being able to extract all the heavy metals sufficiently and, on the other hand, of generating a residue comprising heavy metals but also many other elements volatilized during the heat treatment aiming at extracting the heavy metals.

SUMMARY OF THE INVENTION

The present invention aims at overcoming the drawbacks of the known methods and at judiciously imbricating the heat treatment of the residues of an industrial process (including the residues of cleaning of the fumes generated by this process) with a physico-chemical treatment of the residues, upstream, and a cleaning of the fumes generated by this heat treatment, downstream. It is particularly interesting when the cleaning of the fumes of the industrial process includes a wet cleaning of the fumes generated by this industrial process, as this wet cleaning of the fumes includes a treatment of the liquid effluent which may easily be adapted to the needs of said physico-chemical treatment of the residues as well as of said treatment of the fumes generated by said heat treatment.

Within the meaning of the present invention, heat treatment of residues is understood to be a treatment in which the residues to be treated are taken to a temperature such that phenomena of physical and/or chemical nature occur. Such phenomena may for example be the fusion of the residues allowing a virtual vitrification, a chemical reaction between the residues to be treated and the additives mixed with the residues, a chemical reaction between the residues and a carrier gas, a chemical reaction destroying the organic compounds contained in the residues, for example dioxins and furans, etc. . . . The residues are taken to the required temperature either by indirect means, for example heating by induction, etc. . . . or by direct means for example gas burner, oxygen-doped gas burner, plasma torch, arc furnace, cupola furnace, circulating or static fluidized bed (supplied with air or hot fumes), fluidized bed with combustion of a pulverulent fuel mixed with the residues to be treated, fluidized bed with combustion of the unburnt matter contained in the residues, etc. . . .

The method of heat treatment forming the subject matter of the present invention aims at rendering the residues inert, i.e. in a stable inorganic oxidized form by reducing the organic fraction, particularly the trace pollutants such as dioxins and furans, and immobilizing the heavy metals in the matrix of the treated residue or extracting them from the residues. To that end, said method of heat treatment of residues coming from an industrial process, particularly a combustion process, including residues coming from cleaning the fumes generated by said industrial process, includes, on the one hand, a step of heat treatment and, on the other hand, downstream of said step of heat treatment, a step of cleaning of the fumes generated by said heat treatment and, upstream, a step of physico-chemical treatment of the residues before heat treatment. These three steps are judiciously combined as indicated hereinafter and they present the following specific characters:

a) in the physico-chemical treatment:
the residues, in the form of dust, coming from the dedusting of the fumes generated by said heat treatment, according to c) hereinbelow, may be treated in accordance with said physico-chemical treatment, and the residues to be treated coming from said industrial process are treated either completely, partially, or not at all, in accordance with said physico-chemical treatment,
the residues to be treated in accordance with said physico-chemical treatment are subjected, in manner known per se, to a forced leaching in aqueous phase, then filtered and rinsed,
the resultant aqueous phase is subjected, in manner known per se, to a treatment of neutralization/precipitation producing purified water containing neutral salts, essentially chlorides, and a filter cake containing in ixidized form, hydroxide or carbonate, previously dissolved elements such as the heavy metals;

b) in the heat treatment:
said filtered and rinsed residues and said filter cakes according to a) hereinabove are sent to the heat treatment with possible addition of additives facilitating the heat treatment. The residues to be treated coming from said industrial process and not already treated in accordance with said physico-chemical treatment are sent to said heat treatment,
the fumes generated by said heat treatment, whether they come from a combustion and/or a carrier gas, entrain the elements volatilized in said heat treatment,
the fumes are taken at the end of heat treatment to a temperature appropriate for the dedusting function according to c) hereinafter;

c) in the treatment of the fumes generated by said heat treatment:
the fumes are firstly dedusted in manner known per se and the dust collected is either sent to said physico-chemical treatment to be treated and subsequently sent to said heat treatment; or utilized or dumped when one of the objects of the heat treatment is to extract the heavy metals from the residues to be treated.
the fumes are then cleaned of the other pollutants, i.e. the pollutants in the gaseous state at the temperature at which said dedusting is effected: strongly acid acid pollutants such as HCl, heavy metals in the gaseous state such as Hg, sparingly soluble gaseous pollutants such as $SO_2$, $Cl_2$. Such cleaning is carried out in manner known per se, in one or more stages, by the dry or wet method, possibly with the aid of specific additives. This cleaning includes one or more separate outlets of residues for the compounds volatilized in the heat treatment and which cannot be immobilized effectively in the matrix of the treated residue, during the heat treatment. These specific residues such as mercury, gypsum, are preferably valorized. The washing liquid or liquids of the wet cleaning stage are de-concentrated, after extraction of said specific residues, towards the neutralization/precipitation treatment according to a).

The stage of physico-chemical treatment may be usefully carried out in accordance with the method forming the subject matter of Patent Application FR-A-2 696 955 (LAB S.A.) so as to optimize the residual quantity of volatilizable compounds during the stage of heat treatment. It may also be usefully combined with the treatment of liquid effluent associated with the wet cleaning of the fumes of said industrial process, when the latter includes such a wet cleaning of the fumes.

In a variant of said method of heat treatment, the stage of heat treatment includes, on the one hand, a reducing zone upstream of the evacuation of the fumes, and, on the other hand, an oxidizing zone upstream of the evacuation of the treated residues. The reducing zone may be employed by means of a reducing carrier gas or additives, such as coke, mixed with the residues to be treated.

BRIEF DESCRIPTION OF THE DRAWINGS

A better understanding of the invention may now be obtained thanks to the following detailed description in connection with FIG. 1 which gives a schematic representation of the method forming the subject matter of the invention.

DESCRIPTION OF THE PREFERRED EMBODIMENTS

The residues (1) to be treated are sent (1a) to the stage of physico-chemical treatment and/or directly (1b) to the stage of heat treatment (13). The stage of physico-chemical treatment is carried out by means of two sub-systems (2) and (7). In sub-system (2), the residues are subjected, in manner known per se, to a forced leaching in aqueous phase, then filtered and rinsed. Sub-system 2 receives an addition of water (3) and possibly additives (4) to optimize the result of leaching. The residues (5) thus treated are sent to the stage of heat treatment (13). The liquid effluent (6) coming from the sub-system (2) is sent to a treatment sub-system (7) where it is subjected, in manner known per se, to a treatment of neutralization/precipitation producing purified water (9) and a filter cake (8a) containing in oxidized form, hydroxide or carbonate; inorganic elements dissolved in the sub-system (2); such as heavy metals. This filter cake also contains organic compounds. In a preferred variant, it is useful selectively (8b) to extract the greatest possible part of a volatilizable compound during the heat treatment described hereinafter and for example in the case of a high-temperature heat treatment, the sulfates are usefully extracted in the form of useful gypsum (8b), so as to limit the volatilization of $SO_2$. The purified water (9) contains neutral salts, essentially sodium and calcium chlorides. In the majority of cases, this water may be released in the aquatic medium; in certain cases, this is not possible and the purified water (9) must be evaporated (10) in order to produce a salt (11) re-usable in the chemical industry for example, and water (12) re-usable as substitution for the additional water (3).

These arrangements make it possible, on the one hand, to separate from the residues (1) a large part of the volatilizable compounds by solubilizing the soluble heavy metals and placing them in an oxidized form, carbonate or hydroxide, favourable for immobilization thereof in the matrix of the residues treated and, on the other hand, to extract the soluble neutral salts, essentially the chlorides which, if they were not extracted efficiently upstream, would have to be volatilized during the heat treatment in order that the quality of the residues treated be satisfactory and maintained in the course of time. In this way, the compounds volatilized during the heat treatment (13) are in limited quantities and the dust collected by the dedusting device (19) removing dust from the fumes (18) generated by the heat treatment (13), may be returned (20a) to the sub-system (2) to be subjected to said stage of physico-chemical treatment and thus arrive at immobilizing these compounds in oxidized form in the matrix of the treated residues (17).

In a preferred variant, not shown in FIG. 1, the liquid effluent (6), instead of being treated in a specific sub-system; may be usefully treated in the system of treating the liquid effluent associated with the wet cleaning of the fumes coming from said industrial process when such a wet cleaning exists. The filter cakes coming from said system for treating the liquid effluent are sent to the stage of heat treatment.

The heat treatment (13) receives on the one hand the treated residues (5) and (8a) coming from the sub-systems (2) and (7) of the stage of physico-chemical treatment and, on the other hand, residues (1b) not subjected to this stage, as well as additives (14), these fluxes (1b) and (14) being determined so that the mean composition corresponds to the requirements of the heat treatment. For example, if a fusion/vitrification is desired, the flow of additives (14) may include an addition of silica or of siliceous material for the mean composition to satisfy the requirements of vitrification/fusion taking into account the composition of the residues to be treated in the case considered. The whole of the matter to be treated is taken to the required temperature by means (not shown). These means may be indirect, for example heating by induction, or direct, for example gas burner, oxygen-doped gas burner, plasma torch, arc furnace, cupola furnace, circulating or static fluidized bed supplied with air or hot fumes, fluidized bed with combustion of a pulverulent fuel mixed with the residues to be treated, fluidized bed with combustion of the unburnt matter contained in the residues to be treated, etc. . . . If said means does not bring a sufficient flow of fumes to entrain the volatilized elements, an oxidizing carrier gas (15), for example air, is introduced, in a sufficient quantity to entrain the volatilized elements in the case in question. In the case of incineration of household refuse, the fly ash collected in an electrofilter, placed downstream of the boiler, often does not necessitate additives, the mean composition thereof being able to satisfy the criteria of fusion/vitrification in a temperature range of 1300° C. to 1600° C., maintained for a duration of at least thirty minutes. If an arc furnace is used, a slight flow of air is necessary (15) and may be used in order to introduce the residues into the arc furnace pneumatically. For this same fly ash, an objective of destroying the dioxins and furans and simply agglomerating the finest fines may be attained with a fluidized bed receiving treated ash coming from the stage of physico-chemical treatment and taking it to a temperature of 800 to 900° C., maintained for a duration of at least thirty minutes.

In a variant of said heat treatment, a reducing atmosphere is maintained in a zone of said heat treatment upstream of the fume evacuation, zone in which the residues to be treated are introduced. This reducing atmosphere may be created by the introduction of a reducing carrier gas (16) or by a reducing combustion, in said zone, for example of coke introduced as additive (14) and mixed with the residues to be treated, while the combustion of this same fuel is oxidizing in the zone upstream of the evacuation of the treated residues; zone in which air (15), preferably preheated, is injected; this may be effected with an arrangement of the cupola furnace type.

The fumes (18) generated by the heat treatment are sent to the stage of cleaning of the fumes carried out in several specific sub-systems. In sub-system (19), the fumes (18) are freed of dust, by means known per se, i.e. the compounds in the particulate state at the temperature of said fumes are separated in said dust remover (19). This temperature is adjusted by means (not shown), known per se, such as the concept of the heat treatment or by an exchanger or by an injection of air, etc. . . . The value required for this temperature is different from that required for said heat treatment. It is fixed at a lower level, in order that the compounds volatilized in said heat treatment and which cannot be effectively immobilized during said heat treatment in the matrix of the treated residues (17), are not or hardly collected in the dedusting device (19). The dust collected may then be usefully returned (20a) to the stage of physico-chemical treatment. This arrangement of selective dust-removal of the compounds volatilized in the heat treatment is rendered possible by the stage of physico-chemical treatment which quantitatively minimizes the volatilizable compounds, in particular the chlorides. In the example of the treatment of the fly ash from incineration of household refuse, the stage of physico-chemical treatment may reduce the concentration of chlorides from typically 20% to less than 1% by weight of the ash. By fixing the temperature of the dedusting device (19) at 200–250° C., the mercury, which cannot be effectively immobilized in vitrification/fusion taking into account the particular properties of the mercury and its compounds, remains in the gaseous state and is collected in the fume cleaning downstream of the dedusting device (19) and may be utilized, while the other heavy metals are collected in the dedusting device (19). It should be noted that the selective separation of the mercury is theoretically possible in the stage of physico-chemical treatment; but is not possible in practice due to the high concentrations of numerous compounds and the effects of clogging of the selective separation means such as specific resins. The dust-free fumes (21) are then cleaned of the other pollutants, i.e. the pollutants in the gaseous state at the temperature of the fumes in the dedusting device (19). In a preferred variant, the dust-free fumes (21) are sent in the sub-system (22) for cleaning by the wet method. The washing liquid is maintained at an acid pH (in the example hereinbefore pH <1.5) by injection of acid (23) (for example hydrochloric acid) when the fumes do not contribute sufficient acidity. The addition of water necessary for wet cleaning is not shown. This wet cleaning ensures, in manner known per se, collection of the strongly soluble acid pollutants as well as the collection, possibly with an addition is specific additives (24), of the heavy metals in the gaseous state, particularly mercury. Said washing liquid is deconcentrated (25) towards the sub-system (7) for neutralization/precipitation after the heavy metals collected, particularly mercury; were extracted from said washing liquid; for example by removing from the washing liquid the active charcoal powder used as specific additive (24): the residue (26) concentrates these heavy metals.

When the heat treatment generates gaseous pollutants not collected in said first stage (22) of wet treatment, the fumes (27) are then subjected to a second stage (28) of wet treatment, the washing liquid of which is maintained at a pH level ensuring, in manner known per se, collection of the $SO_2$ and other gaseous pollutants such as chlorine gas which may be emitted during the heat treatment; this second wet treatment is effected in mono-alkaline with addition (29) of lime or in bi-alkaline with addition (29) of lime or limestone in order to produce, in manner known per se, usable gypsum (31) and a liquid effluent (30) sent to the sub-system (7) for neutralization/precipitation. The fumes thus cleaned (32), taking into account their small volume; may be usefully injected in the installation for cleaning the fumes coming from said industrial process.

In another variant, the cleaning of the dust-free fumes (21) includes a first stage of wet cleaning similar to the sub-system (28) described hereinabove which is followed by a stage of adsorption on active charcoal powder placed in suspension in the previously desaturated fumes (circulating reactor) and filtered (bag filter) for collection of the gaseous heavy metals such as mercury.

We claim:

1. A method for the treatment of combustion residues coming from an industrial process of combustion, including residues coming from the dedusting and cleaning of the fumes generated by the industrial process, comprising:

physico-chemical treating at least a first portion of the combustion residues in a physico-chemical treatment stage in which said first portion is subjected to a forced leaching in an aqueous phase, after which the residues are filtered and rinsed to obtain a resultant liquid effluent, and neutralizing and precipitating the resultant liquid effluent to produce a purified water containing neutral salts including chlorides and a filter cake containing inorganic elements dissolved during leaching including heavy metals;

heat treating said filtered and rinsed residues and said filter cake in a heat treatment stage;

generating in the heat treatment stage a matrix of the heat treated residues including elements not volatilized by the heat treatment and removing the matrix from the heat treatment stage;

generating fumes in said heat treatment stage in which elements volatilized by the heat treatment are entrained;

dedusting the fumes in a dedusting stage to separate out dust from the fumes and removing the dust from the dedusting stage;

said dedusting stage including adjusting the temperature of the fumes generated from the heat treatment stage to a lower temperature in order that elements volatilized in the heat treatment stage, which are not removed with the matrix from the heat treatment stage, are generally not separated out as dust during the dedusting stage;

recycling at least a portion of the separated dust to the physico-chemical stage to be treated and subsequently passed to the heat treatment stage; and cleaning other pollutants which were in a gaseous state during the dedusting stage from the dedusted fumes in a cleaning stage, and recovering the other pollutants.

2. The method of claim 1 wherein, in the cleaning stage, cleaning is effected by a wet method in at least one stage wherein the dedusted fumes are treated in a washing liquid which is maintained at an acidic pH by an addition of acid when the dedusted fumes do not contribute sufficient acidity, and said washing liquid being deconcentrated after the other pollutants have been recovered from the washing liquid.

3. The method of claim 2 including a second cleaning stage in which the washing liquid is maintained at a pH level ensuring collection of $SO_2$ and other gaseous pollutants including chlorine gas which may be emitted during the heat treatment stage, said second stage of wet treatment is effected in one of the following: mono-alkaline with addition of lime, bi-alkaline with addition of lime, and limestone, to thereby produce gypsum and a liquid effluent which effluent is sent to the physico-chemical stage.

4. The method of claim 3, wherein the step of cleaning other gaseous pollutants from the dedusted fumes includes placing an active charcoal powder in suspension in the dedusted fumes to thereby adsorb heavy metal pollutants and thereafter separating the active charcoal powder by filtration.

5. The method of claim 3, wherein, in the heat treatment stage, the filtered and rinsed residues are heated to a temperature sufficient for fusion-vitrification, said temperature being in the range 1300 to 1600° C. and said temperature being maintained for a duration of at least thirty minutes.

6. The method or claim 3, wherein, in the stage of heat treatment, the filtered and rinsed residues are taken to a temperature sufficient for destruction of dioxins and furans and for an agglomeration of fine particles, said temperature being in the range 800 to 900° C. and said temperature being maintained for a duration of at least thirty minutes.

7. The method of claim 3, wherein, in the dedusting stage, dedusting is effected on the fumes having a lower temperature in the range 200 to 250° C.

8. The method of claim 1, wherein the step of cleaning other gaseous pollutants from the dedusted fumes includes placing an active charcoal powder in suspension in the dedusted fumes to thereby adsorb heavy metal pollutants and thereafter separating the active charcoal powder by filtration.

9. The method of claim 1, wherein, in the heat treatment stage, the filtered and rinsed residues are heated to a temperature sufficient for fusion-vitrification, said temperature being in the range 1300 to 1600° C. and said temperature being maintained for a duration of at least thirty minutes.

10. The method or claim 1, wherein, in the stage of heat treatment, the filtered and rinsed residues are taken to a temperature sufficient for destruction of dioxins and furans and for an agglomeration of fine particles, said temperature being in the range 800 to 900° C. and said temperature being maintained for a duration of at least thirty minutes.

11. The method of claim 1, wherein, in the dedusting stage, dedusting is effected on the fumes having a lower temperature in the range 200 to 250° C.

12. The method of claim 1, wherein, in the dedusting stage, the dust collected is sent entirely to said physico-chemical treatment stage where it is treated and then subsequently sent to said heat treatment stage.

13. The method of claim 1, wherein all of the combustion residues coming from the industrial process, and all residues coming from dedusting of the fumes, are treated in the physico-chemical treatment stage.

14. The method of claim 1, wherein a second portion of the combustion residues are introduced directly to the heat treatment stage.

* * * * *